(12) United States Patent
Park (10) Patent No.: US 9,684,491 B2
(45) Date of Patent: Jun. 20, 2017

(54) ANNOTATION-BASED ITEM DESCRIPTION

(71) Applicant: Wal-Mart Stores, Inc., Bentonville, AR (US)

(72) Inventor: Minseok Park, Burlingame, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 51 days.

(21) Appl. No.: 13/874,236

(22) Filed: Apr. 30, 2013

(65) Prior Publication Data

US 2014/0325474 A1 Oct. 30, 2014

(51) Int. Cl.
*G06F 9/44* (2006.01)
*G06F 9/455* (2006.01)

(52) U.S. Cl.
CPC .......... *G06F 8/315* (2013.01); *G06F 9/45504* (2013.01)

(58) Field of Classification Search
USPC ......................................................... 717/108
See application file for complete search history.

(56) References Cited

U.S. PATENT DOCUMENTS

| | | | |
|---|---|---|---|
| 5,493,680 A * | 2/1996 | Danforth ...................... | 717/108 |
| 5,499,371 A * | 3/1996 | Henninger et al. ........... | 717/108 |
| 5,699,310 A * | 12/1997 | Garloff et al. ................ | 717/108 |
| 5,805,889 A * | 9/1998 | Van De Vanter ............. | 717/107 |
| 6,523,027 B1 * | 2/2003 | Underwood | |
| 6,581,203 B1 * | 6/2003 | Nguyen et al. ............... | 717/106 |
| 6,876,314 B1 | 4/2005 | Lin | |
| 7,340,481 B1 * | 3/2008 | Baer ....................... | G06F 17/24 |
| 7,533,365 B1 * | 5/2009 | Hogstrom ................. | G06F 8/10 |
| | | | 717/104 |
| 7,693,918 B2 | 4/2010 | Marcjan | |
| 7,707,544 B2 * | 4/2010 | Beust ............................ | 717/106 |
| 7,840,937 B1 * | 11/2010 | Chiluvuri ..................... | 717/106 |
| 7,895,185 B2 | 2/2011 | Chen et al. | |
| 7,958,422 B2 * | 6/2011 | Betawar ......... | G01R 31/318307 |
| | | | 714/742 |
| 8,181,165 B2 * | 5/2012 | Cipresso et al. .............. | 717/137 |
| 8,533,665 B2 * | 9/2013 | Yu et al. ....................... | 717/108 |
| 2002/0073111 A1 * | 6/2002 | Heyliger ....................... | 707/500 |
| 2003/0023514 A1 * | 1/2003 | Adler et al. .................... | 705/27 |
| 2003/0195834 A1 * | 10/2003 | Hillis et al. .................... | 705/37 |
| 2004/0111701 A1 * | 6/2004 | Beust ............................ | 717/108 |
| 2004/0199543 A1 * | 10/2004 | Braud et al. .............. | 707/104.1 |
| 2005/0005261 A1 * | 1/2005 | Severin ........................ | 717/108 |
| 2005/0132270 A1 | 6/2005 | Purcell | |
| 2005/0216885 A1 * | 9/2005 | Ireland .......................... | 717/108 |
| 2005/0240863 A1 * | 10/2005 | Olander et al. ............... | 715/513 |

(Continued)

OTHER PUBLICATIONS

Martyr2, "Parts 1-3 Of Product / Inventory Project", The Coders Lexicon, Dec. 1, 2007, <http://www.coderslexicon.com/parts-1-3-of-product-inventory-project/>.*

(Continued)

*Primary Examiner* — Marina Lee
(74) *Attorney, Agent, or Firm* — Bryan Cave LLP (57) ABSTRACT

Example systems and methods that provide annotations of item descriptions are described. In one implementation, a method accesses data associated with an item and identifies multiple attributes associated with the item. The method further generates a Java class associated with the item and annotates the Java class to include the attributes associated with the item.

22 Claims, 7 Drawing Sheets

(56) References Cited

U.S. PATENT DOCUMENTS

| | | | |
|---|---|---|---|
| 2009/0037459 A1* | 2/2009 | Theobald | 707/102 |
| 2009/0037804 A1* | 2/2009 | Theobald | 715/230 |
| 2009/0204976 A1* | 8/2009 | Hurek et al. | 719/316 |
| 2009/0259683 A1* | 10/2009 | Murty | G06F 17/30607 |
| 2010/0050159 A1* | 2/2010 | Daniel | G06F 11/3624 |
| | | | 717/125 |
| 2010/0122235 A1* | 5/2010 | Betawar | G01R 31/318307 |
| | | | 717/106 |
| 2010/0325540 A1* | 12/2010 | Biazetti | G06F 8/316 |
| | | | 715/708 |
| 2011/0113327 A1* | 5/2011 | Hagelund | G06F 9/4448 |
| | | | 715/265 |
| 2011/0119652 A1* | 5/2011 | Yu et al. | 717/108 |
| 2011/0184828 A1 | 7/2011 | Siegel et al. | |
| 2014/0325332 A1* | 10/2014 | Park | 715/230 |
| 2014/0325474 A1* | 10/2014 | Park | G06F 8/315 |
| | | | 717/108 |

OTHER PUBLICATIONS

"Java annotation", Wikipedia.org, obtained on Mar. 1, 2016, <https://en.wikipedia.org/wiki/Jaya_annotation>, pp. 1-7.*
"Annotation", Wikipedia.org, obtained on Mar. 1, 2016, <https://en.wikipedia.org/wiki/Annotation>, pp. 1-4.*

* cited by examiner

```
@Bean
public class Book {                                          600 long id;

String author;              602
    double price;
    String publisher;
    String isbn;

@Attribute(editable=true)
    public String getAuthor() {                              604
        return author;
    } public void setAuthor(String author) {
        this.author = author;
    }

@Attribute(required=true)
    public double getPrice() {                               606
        return price;
    } public void setPrice(double price) {
        this.price = price;
    }

@Attribute(group="enrichment")
    public String getPublisher() {                           608
        return publisher;
    } public void setPublisher(String publisher) {
        this.publisher = publisher;
    }

@Attribute(label="ISBN-13")
    public String getisbn() {                                610
        return isbn;
    } public void setisbn(String isbn) {
        this.isbn = isbn;
    }
```

FIG. 6

```
@Target ( { ElementType.METHOD, ElementType.ANNOTATION_TYPE } )
@Retention (RetentionPolicy.RUNTIME)
public@interfaceAttribute {

String label ( ) default " ";
    String description ( ) default " ";
    boolean searchable ( ) defaultfalse;
    boolean required ( ) defaultfalse;
    boolean editable ( ) defaulttrue;
    boolean inheritable ( ) default false;
    String [ ] defaultValues ( ) default " ";
    String [ ] queryOperators ( ) default "eq";
    String [ ] group ( ) default " ";
    String [ ] section ( ) default " ";
    int order ( ) default " ";
}
```

FIG. 7

ANNOTATION-BASED ITEM DESCRIPTION

TECHNICAL FIELD

The present disclosure relates to systems and methods that use annotations to describe items.

BACKGROUND

Items being offered for sale in an online marketplace or other ecommerce system are typically described using multiple attributes, such as color, price, model number, manufacturer, product type, size, and the like. Entering data associated with a large number of items can be tedious and time-consuming. Additionally, managing attributes associated with many items may require significant updates when item attributes change and when new attribute categories are added to the online marketplace or other ecommerce system. Managing such systems requires significant resources to maintain software code, data repositories, user interfaces, validation rules, publishing rules, and the like.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein define and manage annotations that describe one or more items. As discussed herein, an annotation-based item description system and method simplifies the definition of new items as well as the management and processing of existing items in an online marketplace. This simplification reduces time, effort, and cost to develop and maintain item management systems. As discussed herein, the annotation-based item description system and method uses annotations within the Java computer programming language to define characteristics of items. By embedding the annotations within the Java source code, the characteristics of particular items are included within a single source code listing rather than requiring the source code to access the item characteristics from another data source or another system. Thus, at runtime, only the source code is needed, which eliminates delays that result from systems that must access item characteristic data from another source. These Java annotations are typically used for developer annotations. However, as described herein, these annotations are used to specifically describe characteristics of items and define rules associated with the items.

Figure 1:
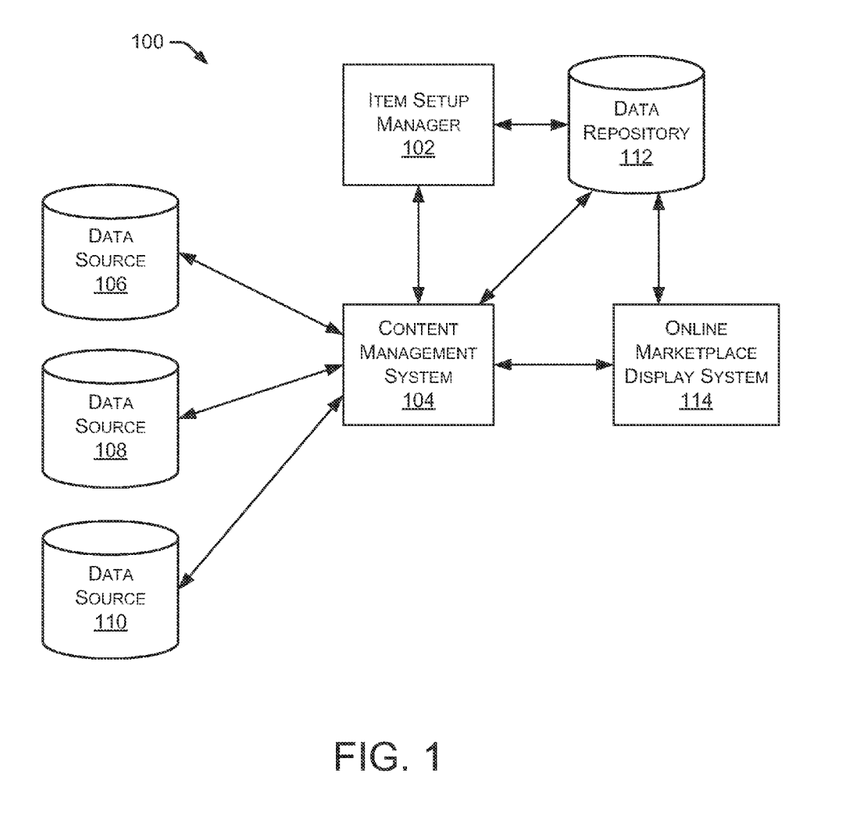
FIG. 1 is a block diagram depicting an environment within which an example embodiment may be implemented.

FIG. 1 is a block diagram depicting an environment 100 within which an example embodiment may be implemented. Environment 100 includes an item setup manager 102 coupled to a content management system 104. Item setup manager 102 defines a new item (e.g., a product or system) being offered through an online marketplace or other system. Content management system 104 manages data associated with a variety of items, systems, devices, and the like. Content management system 104 is coupled to multiple data sources 106, 108, and 110. Although three data sources are shown in FIG. 1, alternate embodiments may include any number of data sources coupled to content management system 104. Data sources 106, 108, and 110 may communicate any type of data in any format with content management system 104. In particular implementations, one or more of data sources 106, 108, and 110 store item information, such as pricing data, inventory data, and promotion data.

Item setup manager 102 and content management system 104 communicate with a data repository 112, which stores various information related to items offered through an online marketplace or other system. An online marketplace display system 114 is coupled to content management system 104 and data repository 112. Online marketplace display system 114 presents, for example, a user interface that allows multiple users to purchase a variety of items available through the online marketplace. Users may interact with online marketplace display system 114 through a variety of device types, such as a smart phone, a tablet computer, a laptop computer, a desktop computer, a portable entertainment device, a portable gaming device, a game console, a set top box, and the like.

Figure 2:
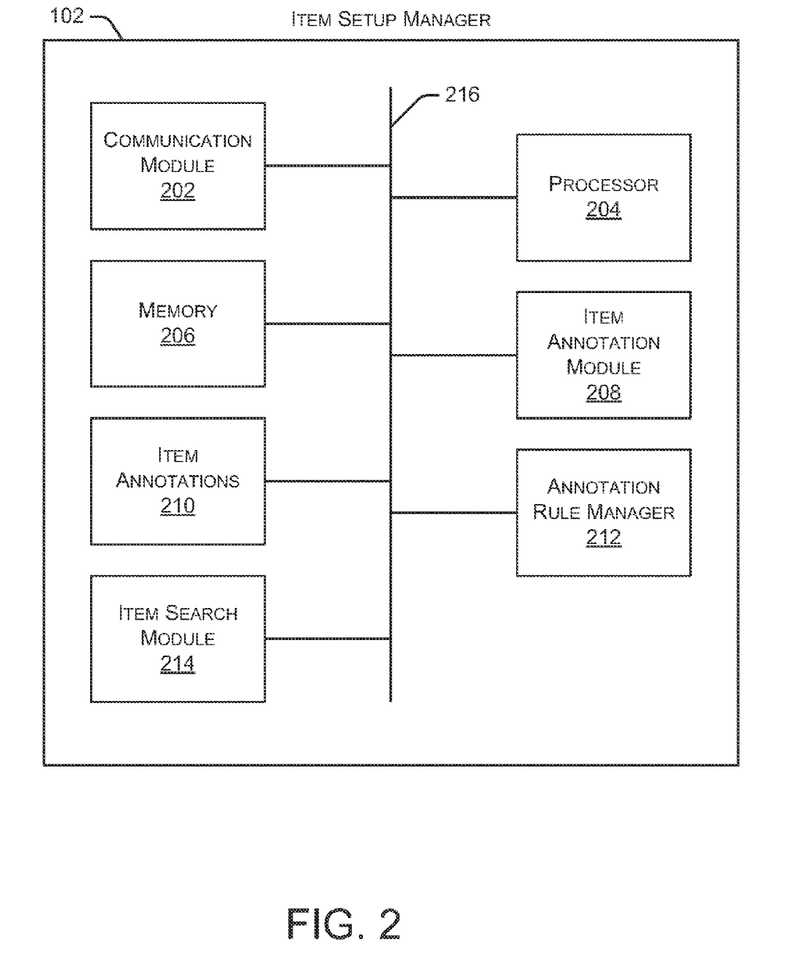
FIG. 2 is a block diagram depicting an embodiment of an item setup manager.

FIG. 2 is a block diagram depicting an embodiment of item setup manager 102, which performs various functions relating to the defining of new items, as discussed herein. Item setup manage 102 includes a communication module 202, a processor 204, and a memory 206. Communication module 202 allows item setup manager 102 to communicate with other systems, such as communication networks, servers, content management system 104, data repository 112, and the like. Processor 204 executes various instructions to implement the functionality provided by item setup manager 102. Memory 206 stores these instructions as well as other data used by processor 204 and other modules contained in item setup manager 102.

Item setup manager 102 also includes an item annotation module 208, which manages the association of various annotations with one or more items. Any number of item annotations 210 are available to item annotation module 208 for defining items. An annotation rule manager 212 applies various rules when associating annotations with one or more items. For example, annotation rule manager 212 may apply validation rules, publishing rules, display rules, and the like. An item search module 214 allows a user of item setup manager 102 to search for items accessible through item setup manager 102. A data communication bus 216 allows the various systems and components of item setup manager 102 to communicate with one another.

Figure 3:
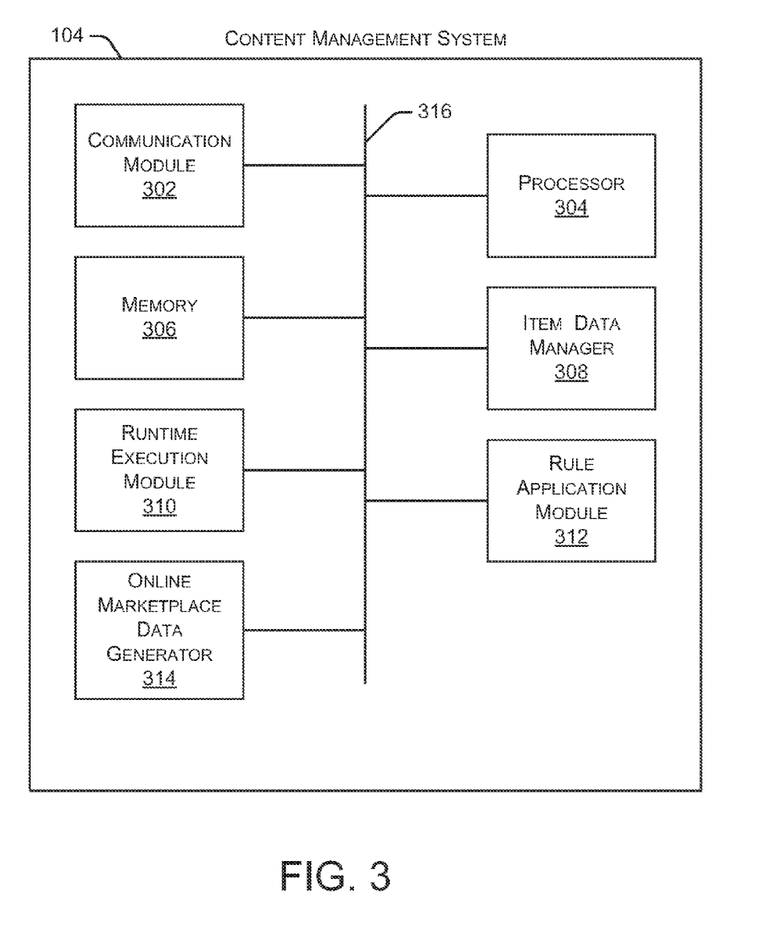
FIG. 3 is a block diagram depicting an embodiment of a content management system.

FIG. 3 is a block diagram depicting an embodiment of content management system 104. Content management system 104 includes a communication module 302, a processor 304, and a memory 306. Communication module 302 allows content management system 104 to communicate with other systems, such as data sources 106, 108, 110, item setup manager 102, online marketplace display system 114, and the like. Processor 304 executes various instructions to implement the functionality described herein with respect to content management system 104. Memory 306 stores these instructions as well as other data used by processor 304 and other modules contained in content management system 104.

Content management system 104 also includes an item data manager 308, which manages data (e.g., product data or service data) associated with any number of different items. A runtime execution module 310 executes various compiled runtime environments, as discussed herein. A rule application module 312 applies various rules contained in item annotations, such as validation rules, publishing rules, and display rules. An online marketplace data generator 314 generates and communicates various data to online marketplace display system 114. In particular implementations, online marketplace data generator 314 generates and communicates item data to online marketplace display system 114. A data communication bus 316 allows the various systems and components of content management system 104 to communicate with one another.

Figure 4:
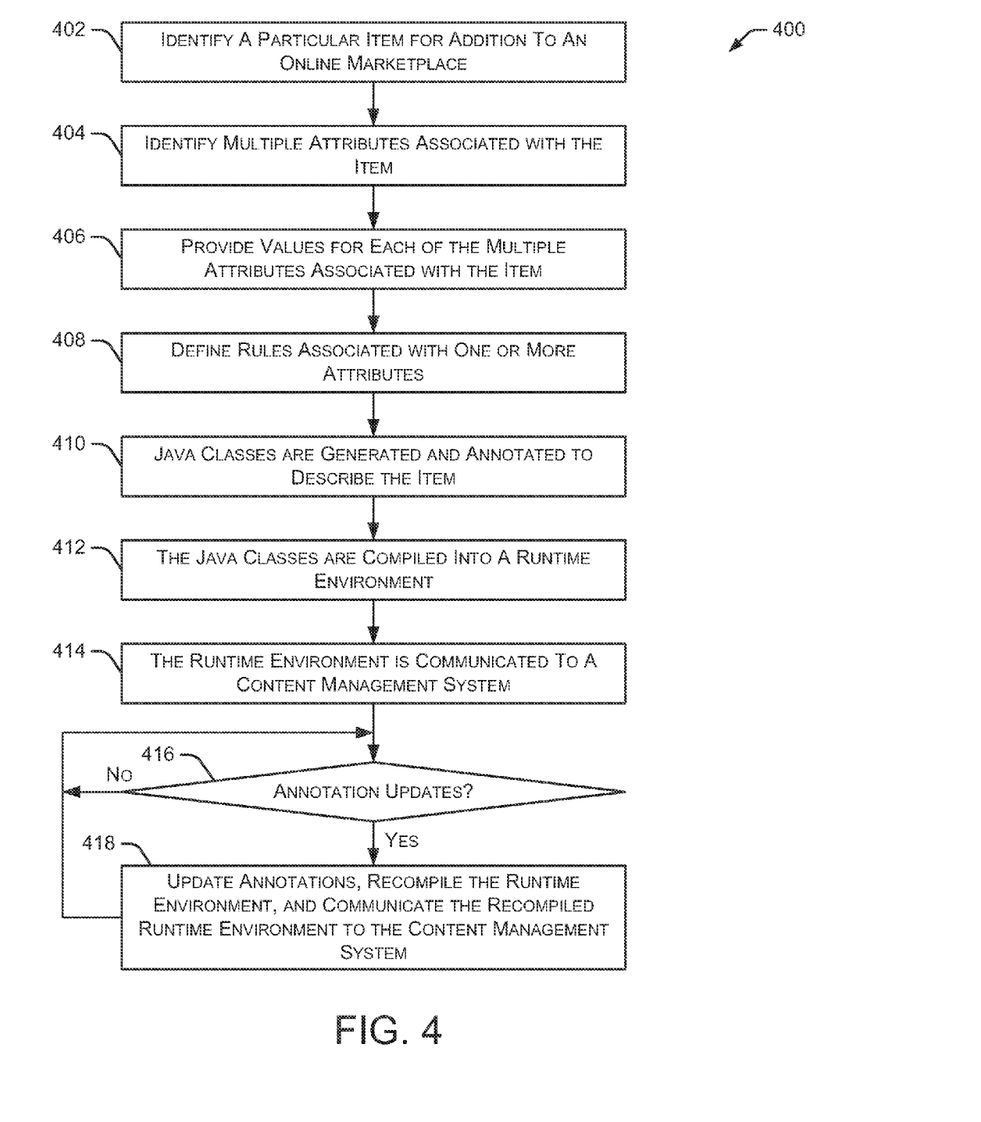
FIG. 4 represents a flow diagram depicting an embodiment of a method for generating annotations that describe an item.

FIG. 4 represents a flow diagram depicting an embodiment of a method 400 for generating annotations that describe an item. Initially, the method 400 identifies a particular item for addition to an online marketplace at 402. Method 400 further identifies multiple attributes associated with the item at 404. Values are provided for each of the multiple attributes associated with the item at 406. In some embodiments, the multiple attributes are received from one or more data sources 106, 108, and 110. Rules associated with one or more attributes are defined at 408. These rules are embedded in the code as part of an item annotation and are read by an annotation rule manager (e.g., annotation rule manager 212 in FIG. 2) to generate and implement internal codes at runtime. The example below is a ShippingPromotion validation rule that is applied when users are editing the item.

```
        @ShippingPromotion(groups = {Edit.class},
message = "Invalid Shipping Promotion Format - {0}")
        @Attribute(group = "ShippingPromotion", order = 2, states =
{State.ShippingLogistics}, editable = true)
            @Usage(value = "Ship promotion flag for zone 1 and zone 2,
            standard LOS")
            public String getStandardPromotion( ) {
            return standardPromotion;
            }
```

The rules mentioned above are applied at runtime when certain actions, such as save, render or publish, are triggered. For example, when a save action is triggered, the rule manager will execute all of the validation rules annotated for the items identified to be saved before actually saving the items.

The method 400 continues as Java classes are generated and annotated to describe the item at 410. By embedding the annotations within the Java class source code, the characteristics of the item are included within a single source code listing rather than requiring the source code to access the item characteristics from another data source or another system. Thus, at runtime, only the source code (with the embedded annotations) is needed, which eliminates delays that result from traditional systems that must access item characteristic data from another source.

The java classes are then compiled into a runtime environment at 412. The runtime environment is communicated to a content management system (or other system) at 414. When method 400 detects an update to any of the annotations at 416, the appropriate annotations are updated, the runtime environment is recompiled, and the recompiled runtime environment is communicated to the content management system (or other system) at 418.

Figure 5:
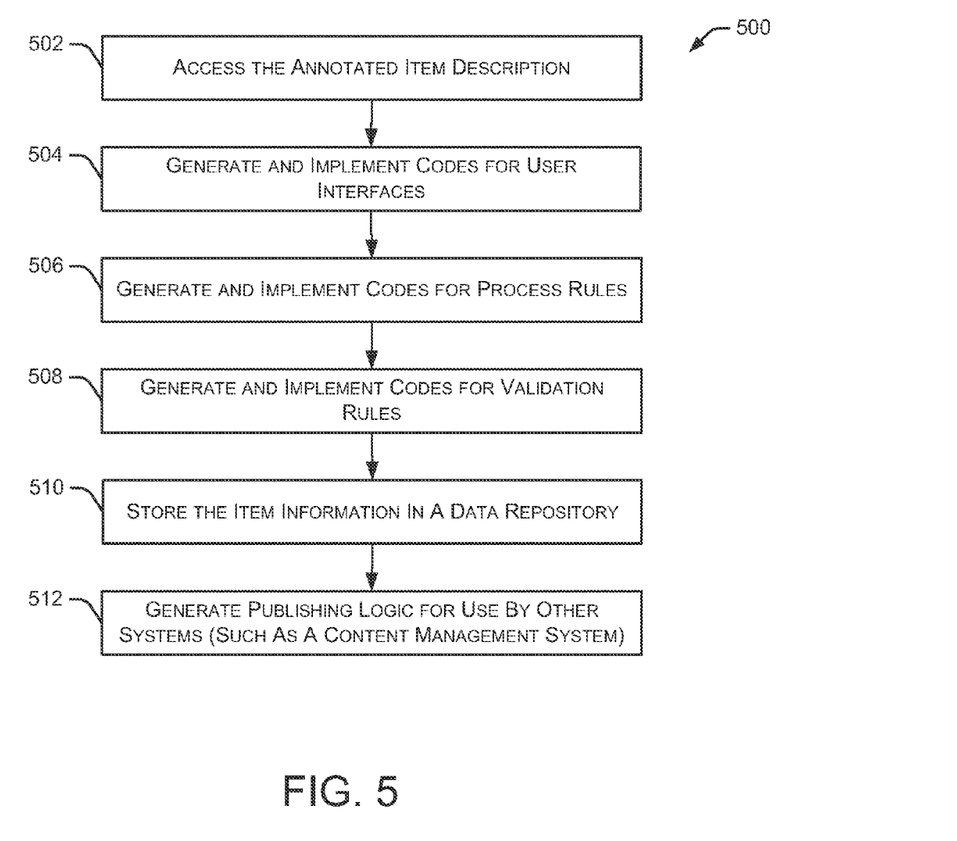
FIG. 5 is a flow diagram depicting an embodiment of a method for compiling Java classes into a runtime environment.

FIG. 5 is a flow diagram depicting an embodiment of a method 500 for compiling Java classes into a runtime environment. Initially, the method 500 accesses an annotated item description at 502. The method 500 then generates and implements codes for user interfaces at 504. Additionally, the method generates and implements codes for process rules at 506 and for validation rules at 508. The item information is then stored in a data repository (e.g., data repository 112 in FIG. 1) at 510. Finally, the method 500 generates publishing logic for use by other systems at 512, such as a content management system. The validation rules are executed (or evaluated) during runtime. The various production information (e.g., attribute values) are stored during runtime in the data repository when, for example, a save action is triggered. Additionally, the publishing logic is performed during runtime.

Figure 6:
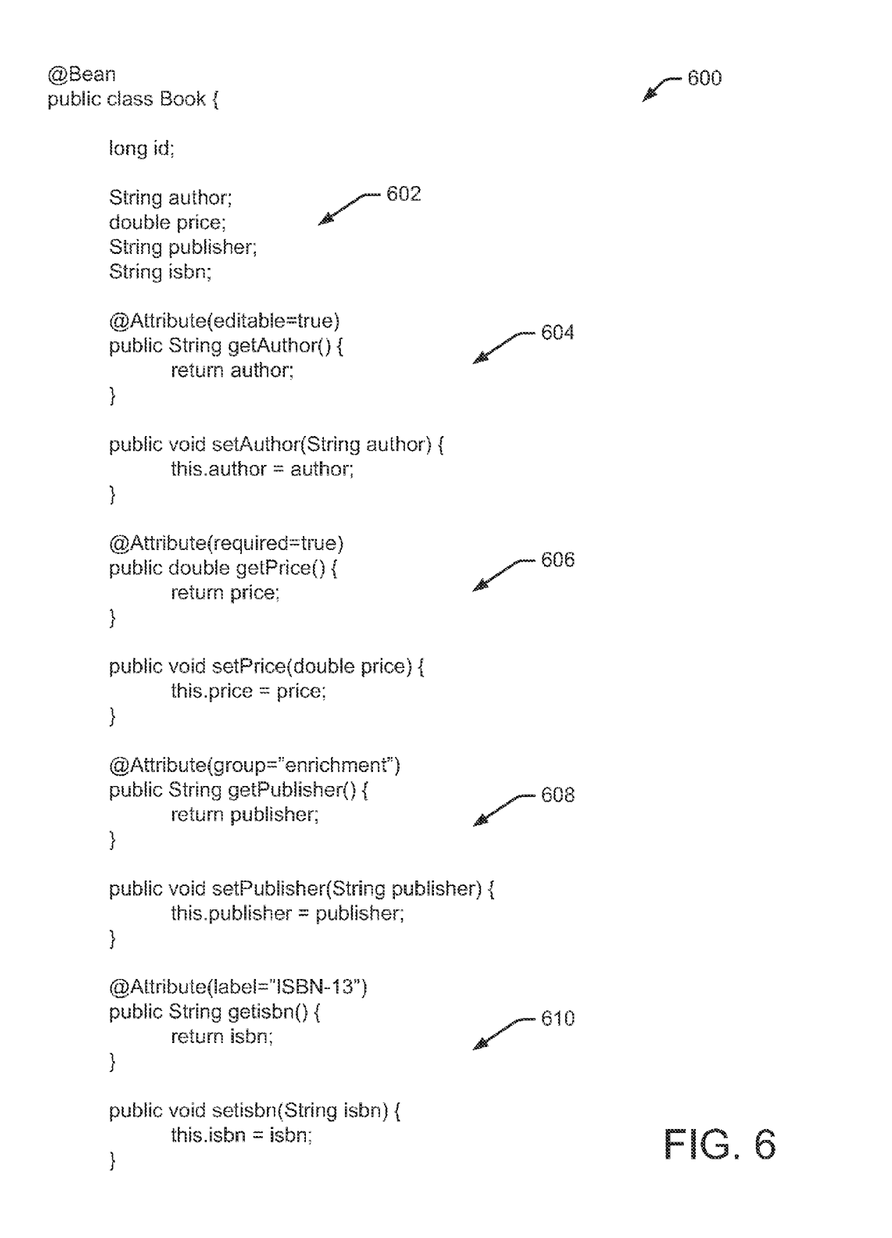
FIG. 6 is an example annotated Java class for a book.

FIG. 6 is an example annotated Java class 600 for a book. In this example, variables "author", "price", "publisher", and "isbn" are defined at 602. "Author" refers to the author of a particular book, "price" refers to the price of the book, "publisher" identifies the entity that publishes the book, and "isbn" refers to an "International Standard Book Number" associated with the book. The code sequence at 604 defines the author attribute and the code sequence at 606 defines the price attribute. Similarly, the code sequence at 608 defines the publisher attribute and the code sequence at 610 defines the isbn attribute.

Figure 7:
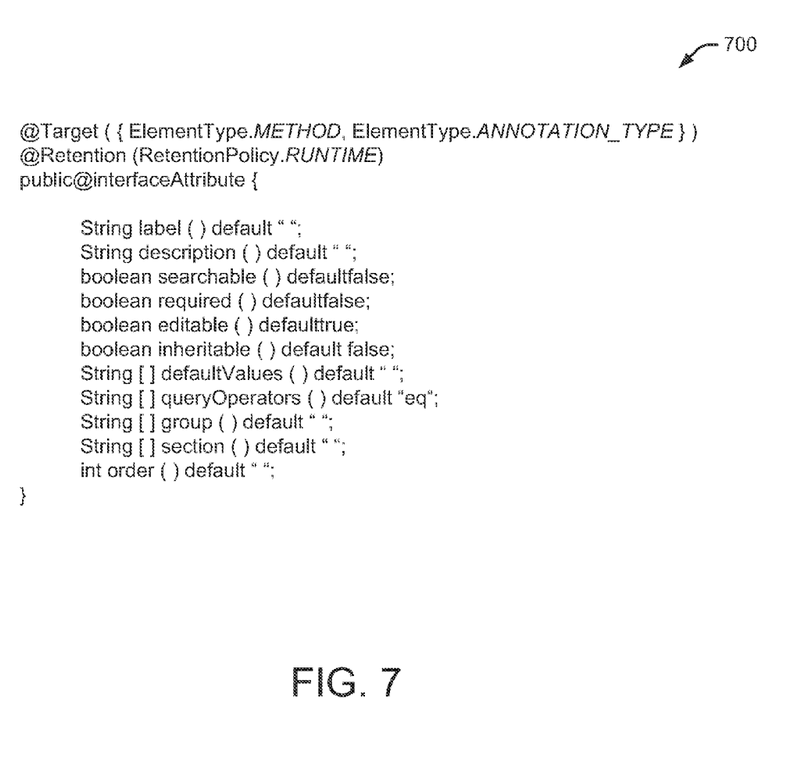
FIG. 7 is an example annotation used to provide an item description.

FIG. 7 is an example annotation 700 used to provide an item description. FIG. 6 is an example of the annotation 700 applied to a class, Book. In this example, in runtime, the value of "label" appears as an attribute name on an item edit/view display generated by the item setup manager 102 (FIG. 1). All of the attributes that are grouped together using @Attribute(group="enrichment"), for example, will be grouped together on the edit/view display. When the content management system 104 saves or publishes the items, the annotated validation rules are performed. Thus, the annotations are used by both the item setup manager 102 and the content management system 104 to render the edit/view display, perform validation rules automatically, and selectively store and publish only the annotated attributes.

All of the annotated attributes in a particular class (such as the Book class discussed herein) are mapped to a display screen and a data repository. Any item class can have multiple attributes, but some of the attributes may not be relevant from an item setup, management, or display perspective. Thus, the systems and methods described herein provide a flexible structure that supports the selective annotation of attributes such that only the important and relevant attributes are managed.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
    accessing data associated with an item offered for sale in an online marketplace;
    identifying a plurality of attributes associated with the item;
    generating, using one or more processors, a class, in a JAVA programming language, associated with the item;
    annotating the class using annotation-type declarations in the JAVA programming language, each of the annotation-type declarations comprising an at sign (@) followed by an interface keyword, the annotation-type declarations comprising first annotation-type declarations that include one or more attributes of the plurality of attributes associated with the item, and the first annotation-type declarations describing the item within source code of the class; and
    defining, using the one or more processors, one or more rules associated with each of the one or more attributes of the plurality of attributes associated with the item, wherein:
        the annotation-type declarations describing the item comprise at least one of an item class, an item title, an item price, an item author, an item manufacturer, an item description, or item shipping data;
        the annotation-type declarations further comprise second annotation-type declarations; and
        the second annotation-type declarations comprise the one or more rules that are compilable to implement the one or more rules in machine-executable instructions in a runtime environment.

2. The method of claim 1, wherein:
    the one or more rules include a validation rule associated with the item.

3. The method of claim 1, wherein:
    the one or more rules include a publishing rule associated with the item.

4. The method of claim 1, wherein:
    the one or more rules include a display rule associated with the item.

5. The method of claim 1, wherein the first annotation-type declarations include metadata that defines characteristics of the item.

6. The method of claim 1, further comprising compiling the class with the annotation-type declarations into the runtime environment.

7. The method of claim 6, further comprising communicating the runtime environment to a content management system.

8. The method of claim 1, further comprising identifying changes to any of the plurality of attributes associated with the item.

9. The method of claim 8, further comprising updating the annotation-type declarations in the class based on the changes identified, responsive to identifying the changes to any of the plurality of attributes associated with the item.

10. The method of claim 9, further comprising compiling the class with the annotation-type declarations, as updated, into the runtime environment.

11. A system comprising:
a memory to store data associated with at least one item; and
one or more processors coupled to the memory, the one or more processors configured to:
access data associated with the item offered for sale in an online marketplace;
identify a plurality of attributes associated with the item;
generate a class, in a JAVA programming language, associated with the item;
annotate the class using annotation-type declarations in the JAVA programming language, each of the annotation-type declarations comprising an at sign (@) followed by an interface keyword, the annotation-type declarations comprising first annotation-type declarations that include one or more attributes of the plurality of attributes associated with the item, and the first annotation-type declarations describing the item within source code of the class;
define one or more rules associated with each of the one or more attributes of the plurality of attributes associated with the item; and
generate publishing logic for use by a content management system,
wherein:
the annotation-type declarations further comprise second annotation-type declarations; and
the second annotation-type declarations comprise the one or more rules that are compilable to implement the one or more rules in machine-executable instructions in a runtime environment.

12. The method of claim 1, further comprising:
compiling the class with the annotation-type declarations into the runtime environment;
communicating the runtime environment to a content management system;
identifying changes to any of the plurality of attributes associated with the item; and
updating the annotation-type declarations in the class based on the changes identified, responsive to identifying the changes to any of the plurality of attributes associated with the item,
wherein:
the first annotation-type declarations include metadata that defines characteristics of the item; and
the one or more rules include a validation rule associated with the item.

13. The system of claim 11, wherein the one or more processors are further configured to:
compiling the class with the annotation-type declarations into the runtime environment;
communicating the runtime environment to the content management system;
identifying changes to any of the plurality of attributes associated with the item; and
updating the annotation-type declarations in the class based on the changes identified, responsive to identifying the changes to any of the plurality of attributes associated with the item,
wherein:
the first annotation-type declarations include metadata that defines characteristics of the item; and
the one or more rules include a validation rule associated with the item.

14. A system comprising:
a memory to store data associated with at least one item; and
one or more processors coupled to the memory, the one or more processors configured to perform:
accessing data associated with the item offered for sale in an online marketplace;
identifying a plurality of attributes associated with the item;
generating a class, in a JAVA programming language, associated with the item;
annotating the class using annotation-type declarations in the JAVA programming language, each of the annotation-type declarations comprising an at sign (@) followed by an interface keyword, the annotation-type declarations comprising first annotation-type declarations that include one or more attributes of the plurality of attributes associated with the item, and the first annotation-type declarations describing the item within source code of the class; and
defining one or more rules associated with each of the one or more attributes of the plurality of attributes associated with the item,
wherein:
the annotation-type declarations describing the item comprise at least one of an item class, an item title, an item price, an item author, an item manufacturer, an item description, or item shipping data;
the annotation-type declarations further comprise second annotation-type declarations; and
the second annotation-type declarations comprise the one or more rules that are compilable to implement the one or more rules in machine-executable instructions in a runtime environment.

15. The system of claim 14, wherein:
the one or more rules include a validation rule associated with the item.

16. The system of claim 14, wherein:
the one or more rules include a publishing rule associated with the item.

17. The system of claim 14, wherein:
the one or more rules include a display rule associated with the item.

18. The system of claim 14, wherein the first annotation-type declarations include metadata that define characteristics of the item.

19. The system of claim 14, wherein the one or more processors are further configured to perform compiling the class with the annotation-type declarations into the runtime environment.

20. The system of claim 19, wherein the one or more processors are further configured to perform communicating the runtime environment to a content management system.

21. The system of claim 14, wherein the one or more processors are further configured to perform identifying changes to any of the plurality of attributes associated with the item.

22. The system of claim 21, wherein the one or more processors are further configured to perform updating the annotation-type declarations in the class based on the changes identified, responsive to identifying the changes to any of the plurality of attributes associated with the item.

* * * * *